US012281767B2

(12) United States Patent
Fischer et al.

(10) Patent No.: US 12,281,767 B2
(45) Date of Patent: Apr. 22, 2025

(54) LIGHTING DEVICE FOR A MOTOR VEHICLE HAVING A COLLIMIATION OPTICAL SYSTEM AND A SECONDARY OPTICAL UNIT WITH SEQUENTIAL LENS ARRAYS

(71) Applicant: HELLA GmbH & Co. KGaA, Lippstadt (DE)

(72) Inventors: Bernd Fischer, Altenbeken (DE); Christian Schmidt, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/597,476

(22) Filed: Mar. 6, 2024

(65) Prior Publication Data

US 2024/0247775 A1 Jul. 25, 2024

Related U.S. Application Data

(63) Continuation of application No. PCT/EP2022/073673, filed on Aug. 25, 2022.

(30) Foreign Application Priority Data

Sep. 6, 2021 (DE) ..................... 10 2021 122 953.7

(51) Int. Cl.
*F21S 41/265* (2018.01)
*F21S 41/143* (2018.01)
(Continued)

(52) U.S. Cl.
CPC ........... *F21S 41/265* (2018.01); *F21S 41/143* (2018.01); *F21S 41/153* (2018.01); *F21S 41/29* (2018.01);
(Continued)

(58) Field of Classification Search
CPC ...... F21S 41/265; F21S 41/153; F21S 41/151; F21V 5/007
See application file for complete search history.

(56) References Cited

U.S. PATENT DOCUMENTS

| | | | |
|---|---|---|---|
| 9,651,213 | B2 | 5/2017 | Kliebisch |
| 10,232,763 | B1 | 3/2019 | Eckstein et al. |

(Continued)

FOREIGN PATENT DOCUMENTS

| | | | |
|---|---|---|---|
| DE | 102005013950 A1 | 9/2006 | |
| DE | 102012108309 A1 | 3/2014 | |

(Continued)

OTHER PUBLICATIONS

International Search Report dated Dec. 9, 2022 in corresponding application PCT/EP2022/073673.

*Primary Examiner* — Robert J May
(74) *Attorney, Agent, or Firm* — Muncy, Geissler, Olds & Lowe, P.C.

(57) ABSTRACT

A lighting device for a motor vehicle, in particular a headlight for a motor vehicle, comprising a plurality of light sources from which light is emitted during operation of the lighting device, and a collimation optical system that includes a plurality of collimating lenses, each having an entry surface and an exit surface through which the light emitted from the light sources passes, and a secondary optical unit that includes at least one array of lenses. The light emitted from the collimation optical system passes through the at least one array of lenses. The collimating lenses are arranged in at least two rows, at least two of the collimating lenses being adjacently situated in each of the rows in a first direction and the rows being adjacently situated in a second direction that is substantially perpendicular to the first direction.

14 Claims, 2 Drawing Sheets

(51) Int. Cl.

| | |
|---|---|
| ***F21S 41/153*** | (2018.01) |
| ***F21S 41/29*** | (2018.01) |
| ***F21V 5/00*** | (2018.01) |
| ***F21V 5/04*** | (2006.01) |
| *F21Y 105/16* | (2016.01) |
| *F21Y 115/10* | (2016.01) |

(52) U.S. Cl.
CPC .............. *F21V 5/007* (2013.01); *F21V 5/043* (2013.01); *F21Y 2105/16* (2016.08); *F21Y 2115/10* (2016.08)

(56) References Cited

U.S. PATENT DOCUMENTS

| | | | | |
|---|---|---|---|---|
| 10,563,836 | B2 | 2/2020 | Fischer et al. | |
| 10,718,483 | B2 | 7/2020 | Fischer | |
| 11,815,241 | B2 | 11/2023 | Fischer et al. | |
| 2006/0215401 | A1 | 9/2006 | Menzel et al. | |
| 2016/0265733 | A1* | 9/2016 | Bauer | F21S 41/16 |
| 2018/0306400 | A1 | 10/2018 | Muegge | |
| 2020/0332977 | A1 | 10/2020 | Miedler et al. | |
| 2021/0199257 | A1 | 7/2021 | Lee | |
| 2021/0341123 | A1 | 11/2021 | Mototsuji | |

FOREIGN PATENT DOCUMENTS

| | | | | |
|---|---|---|---|---|
| DE | 102013202334 | A1 | 8/2014 | |
| DE | 102018107213 | A1 | 10/2019 | |
| DE | 102018107214 | A1 | 10/2019 | |
| DE | 102020102226 | A1 | 8/2021 | |
| JP | 2008078043 | A * | 4/2008 | |
| JP | 2008078043 | A1 | 4/2008 | |
| WO | WO-2017066817 | A1 * | 4/2017 | F21S 41/00 |
| WO | WO2019101571 | A1 | 5/2019 | |
| WO | WO2020071413 | A1 | 4/2020 | |

* cited by examiner

LIGHTING DEVICE FOR A MOTOR VEHICLE HAVING A COLLIMIATION OPTICAL SYSTEM AND A SECONDARY OPTICAL UNIT WITH SEQUENTIAL LENS ARRAYS

This nonprovisional application is a continuation of International Application No. PCT/EP2022/073673, which was filed on Aug. 25, 2022, and which claims priority to German Patent Application No. 10 2021 122 953.7, which was filed in Germany on Sep. 6, 2021, and which are both herein incorporated by reference.

BACKGROUND OF THE INVENTION

Field of the Invention

The present invention relates to a lighting device for a motor vehicle, in particular a headlight for a motor vehicle.

Description of the Background Art

A lighting device is known from WO 2019/101571 A1, which corresponds to US 2020/0332977. The light module for a motor vehicle headlight described therein comprises at least one light source, and at least one optical imaging system that images light, generated by the at least one light source into a region in front of the light module, in the form of at least one light distribution of a predefined type, the optical imaging system comprising an entry optical unit, an exit optical unit, and at least one beamforming device that is situated between the entry optical unit and the exit optical unit, the entry optical unit being configured to capture the light generated by the at least one light source and to conduct it in the form of multiple light beams in the direction of the beamforming device, the beamforming device being configured to shape the multiple beams to form at least one intermediate image of a predefined type, and the exit optical unit being designed to project the at least one intermediate image of a predefined type in the form of at least one light distribution of a predefined type into a region in front of the light module, the beamforming device being designed as a continuous layer which extends in a plane perpendicular to the optical axis of the optical imaging system, and which is controllable with regard to its transparency, and the total quantity of light penetrating from the entry optical unit to the exit optical unit being influenceable by adjusting the transparency of the continuous layer.

A further lighting device for a motor vehicle is known from DE 10 2018 107 214 A1, which corresponds to US 2019/0301699, which is incorporated herein by reference. The invention relates to a lighting device for vehicles, comprising a light source unit containing a number of light sources, with an optical unit situated in the main emission direction in front of the light source unit for generating a predefined light distribution, the optical unit having a micro-optical field with a plurality of micro-optical elements arranged in a matrix, wherein a first subfield of the micro-optic field has an optic-free design to form a first partial light distribution with a light-dark cutoff and with a luminance maximum in an area near the light-dark cutoff, and in which at least one second subfield of the micro-optic field has micro-optical elements such that a second partial light distribution is formed in the vertical direction below the first partial light distribution, wherein a luminance maximum of the second partial light distribution in the vertical direction is situated below the luminance maximum of the first partial light distribution in such a way that the light is formed by superimposition of the first partial light distribution and the further partial light distribution.

A further lighting device for a motor vehicle is known from DE 10 2018 107 213 A1, which corresponds to US 2019/0301696, which is incorporated herein by reference. The lighting device described therein is designed as a low beam module of a headlight and includes three light-emitting diodes (LEDs), adjacently situated in a horizontal row, from which light is emitted during operation of the lighting device. The lighting device also includes three collimating lenses adjacently situated in a horizontal row, one of the collimating lenses being associated in each case with one of the light sources, so that the light emitted from one of the light sources passes through the associated collimating lens. Each of the collimating lenses has an entry surface facing the associated light source, and has an exit surface opposite thereto. An aperture is provided on the entry surface of each of the collimating lenses. The lighting device also includes a secondary optical unit through which the light emitted from the collimation optical system passes. The secondary optical unit includes a substrate with an array of cylindrical lenses on an entry surface facing the collimation optical system, and with an array of prisms on an oppositely situated exit surface. Each of the collimating lenses images the imaging plane, which is present on the entry surface of the collimating lenses and given by the aperture, into the exterior space of the vehicle into infinity. The cylindrical lenses have vertically oriented cylinder axes, so that the array of cylindrical lenses causes horizontal spreading of the light distribution. The prisms deflect the light in the vertical direction, so that the prisms together with the collimating lenses and the configuration of the light-emitting diodes achieve the desired illumination in the vertical direction.

In the conventional lighting devices, it is considered to be disadvantageous that they fulfill only the lighting function of a low beam, whereas for the lighting function of the high beam a further system must be provided. These types of systems are made up, for example, of a light source that includes light-emitting diodes, a primary optical unit, a shutter, and an imaging lens. These systems generally have a large installation volume and are relatively heavy. When a lens is trimmed for such a large-volume system in order to achieve a small light exit surface, this results in a tremendous drop in efficiency.

SUMMARY OF THE INVENTION

It is therefore an object of the present invention to provide a lighting device that has a compact design, in particular despite achieving different lighting functions.

In an example, it is provided that only a first array of lenses may be associated at least with a first of the rows of light sources and/or at least with a first of the rows of collimating lenses, and a first array and a second array of lenses may be associated with at least a second of the rows of light sources and/or with at least a second of the rows of collimating lenses.

For example, the dimensions of the collimation optical system may be between 30×30 mm and 50×50 mm. A very compact module may thus be provided, with which multiple lighting functions may be achieved despite its small installation size.

The light sources can be arranged in at least two rows, in each of the rows at least two of the light sources being adjacently situated in the first direction, and the rows being adjacently situated in the second direction. This arrangement of the light sources likewise contributes to providing a module having a small installation size, with which multiple lighting functions may be achieved.

It is provided that one of the collimating lenses and at least one array of lenses of the secondary optical unit are associated in each case with one of the light sources in such a way that the light emitted from the light source passes in succession through the associated collimating lens and the associated array of lenses. Such a module may have a compact design, so that without cooling systems it has a width of approximately 30 mm, a height of approximately 30 mm, and a depth of approximately 22 mm, for example.

It may be provided that at least a first of the rows of light sources and at least a first of the rows of collimating lenses as well as the associated array of lenses are configured to generate a first lighting function, for example a high beam, and that at least a second of the rows of light sources and at least a second of the rows of collimating lenses as well as the associated array of lenses are configured to generate a second lighting function, for example a low beam or a portion of a low beam. In particular, it may be provided that the lighting device is configured to generate three different lighting functions, in particular wherein a first of the lighting functions is a high beam, a second of the lighting functions is a front field portion of a low beam, and a third of the lighting functions is a range portion of a low beam. Despite the compact design of the lighting device, it can fulfill all lighting functions of a headlight and still meet regulatory requirements.

There is an option for the first direction, in the installed state of the lighting device in the vehicle, to correspond to a horizontal direction, and for the second direction, in the installed state of the lighting device in the vehicle, to correspond to the vertical direction. Different rows or lines of the arrays of light sources and collimation optical systems thus generate different lighting functions. Alternatively, it may be provided that different columns of the arrays of light sources and collimation optical systems generate different lighting functions.

There is an option for the lighting device to include a substrate on which all collimating lenses are provided, or for the lighting device to include a plurality of substrates for the collimating lenses, the substrates being adjacently situated in the first and/or the second direction. Providing all collimating lenses on a substrate results in the desired compact design of the collimation optical system. On the other hand, the column-by-column or line-by-line division into multiple substrates may be advantageous, for example when a modular design is desired to allow different lighting devices to be combined.

It may be provided that the lighting device has at least one aperture that is situated, for example, on the entry surface of one of the collimating lenses, or between one of the light sources and one of the collimating lenses. The aperture may be used, for example, to generate a light-dark cutoff of the low beam distribution, for example, of the range portion of the low beam.

There is an option for the lenses of the at least one array of the secondary optical unit to be designed as cylindrical lenses. In particular, the cylindrical lenses are adjacently situated in the first direction, the cylinder axes of the cylindrical lenses extending in the second direction. Horizontal spreading of the light distribution is achieved by this arrangement of the cylinder axes in the vertical direction.

It is provided that the secondary optical unit can include at least one first array of lenses and at least one second array of lenses, the light that is emitted from the associated collimating lens first passing through the first array of lenses and subsequently through the second array of lenses. For example, the first array of lenses may generate a plurality of intermediate images of the at least one aperture in the space between the two arrays of lenses, in particular it being possible for the second array of lenses to image the intermediate images, in the installed state of the lighting device in the vehicle, into the exterior space of the vehicle, in particular into infinity. By use of the second array of lenses, the light distribution in the exterior space of the vehicle may be controlled in a targeted manner.

In particular, for generating the first lighting function used as a high beam, and the second lighting function used as a front field portion of the low beam, it is possible in each case to provide only a first array of lenses, and for generating the third lighting function used as a range portion of the low beam, to provide a first array and a second array of lenses. By using two arrays of cylindrical lenses arranged in succession, the typically asymmetrical light-dark cutoff of the range portion of the low beam may be imaged into the exterior space of the vehicle in a controlled manner.

The lenses of the first array of the secondary optical unit that are configured to generate different lighting functions can have different shapes, for example different radii of curvature, and/or that the lenses of the first array and/or of the second array of the secondary optical un that are configured to generate the same lighting functions have different shapes, for example different radii of curvature. For example, the lenses of the array provided for generating the high beam may have a larger radius of curvature than the lenses of the array provided for generating the front field portion and the range portion of the low beam. Furthermore, the lenses of the array provided for generating the front field portion of the low beam may have a smaller radius of curvature than the lenses of the array provided for generating the range portion of the low beam. In addition, there is an option for lenses that are used to generate the same lighting function to have different designs in order to form the light distribution of the corresponding lighting function in a targeted manner.

The collimating lenses that are configured to generate different lighting functions can have different shapes and/or that the collimating lenses that are configured to generate the same lighting functions have different shapes. Here, similarly as for the lenses of the array of the secondary optical unit, the collimating lenses used for different lighting functions may have different designs, for example different focal lengths or different shapes of the entry surfaces and exit surfaces. In addition, collimating lenses that are used to generate the same lighting function may have different designs in order to form the light distribution of the corresponding lighting function in a targeted manner.

There is also an option for the light sources to include in each case at least one light-emitting diode and/or at least one laser diode.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
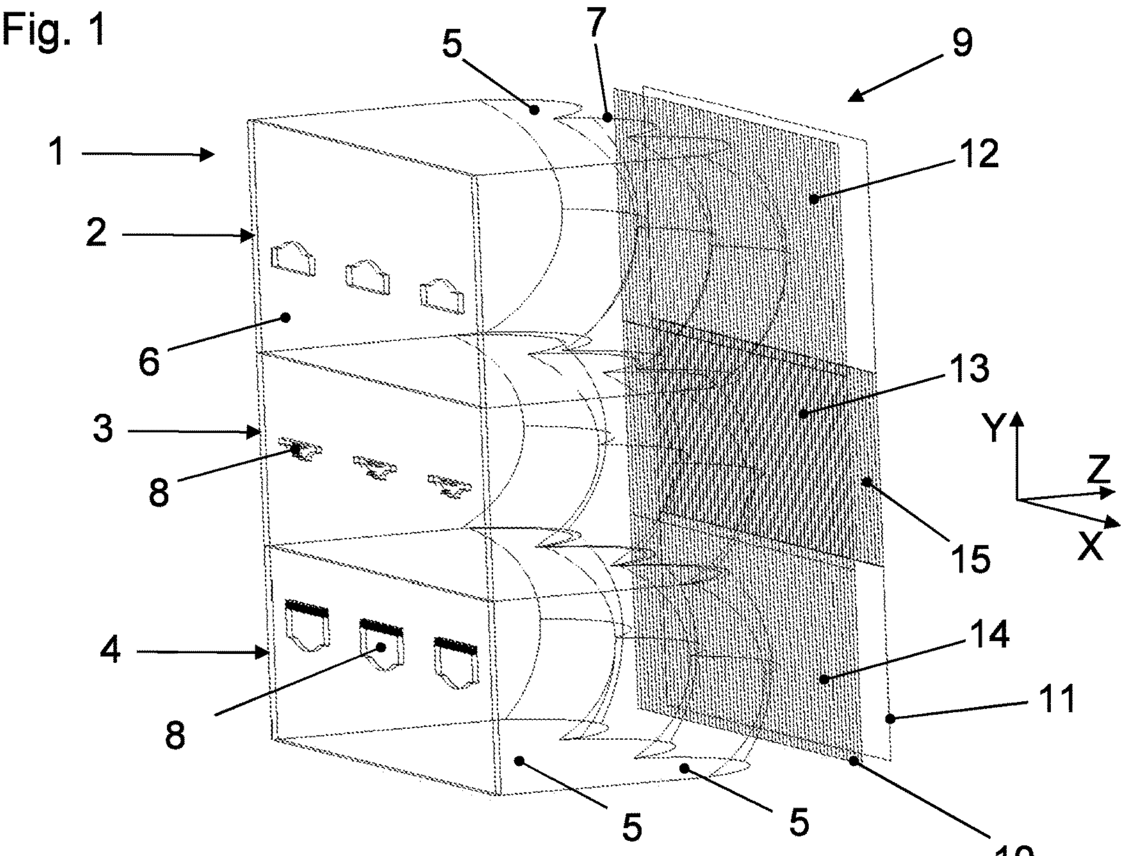
FIG. 1 shows a perspective view of a portion of an example of a lighting device according to the invention.

The embodiment of a lighting device according to the invention depicted in the figures is designed as a headlight. The lighting device comprises a plurality of light sources, a collimation optical system 1, and a secondary optical unit 9.

The light sources are designed as light-emitting diodes (LED), from which light is emitted during operation of the lighting device. For example, the illustrated embodiment of the lighting device may have three rows, each containing three spaced-apart light-emitting diodes. The light-emitting diodes may in particular be situated on a shared circuit board.

The light sources in each row are situated adjacently and at a distance from one another in a first direction X. In addition, the rows of the light sources are situated adjacently and at a distance from one another in a second direction Y that is perpendicular to the first direction X. A sufficient distance between the light-emitting diodes may be thermally favorable or may bring about effective heat dissipation of the lighting device.

In particular, the first direction X in the installed state of the lighting device in the vehicle corresponds to a horizontal direction, whereas the second direction Y in the installed state of the lighting device in the vehicle corresponds to the vertical direction.

There is of course the option to provide more than three or fewer than three light sources per row. There is also the option to provide more than three or fewer than three rows of light sources.

The lighting device also comprises a one-piece collimation optical system 1, through which the light emitted from the light sources passes, at least partially, during operation of the lighting device. In the illustrated exemplary embodiment, the collimation optical system 1 has three rows 2, 3, 4 of collimating lenses 5 situated one beneath the other in the second direction Y in FIGS. 1 and 2. Three collimating lenses 5 adjacently situated in the first direction X are provided in each of rows 2, 3, 4.

There is also the option to provide more than three or fewer than three collimating lenses 5 per row 2, 3, 4. There is also the option to provide more than three or fewer than three rows 2, 3, 4 of collimating lenses 5.

Each of the collimating lenses 5 has an entry surface 6 facing the light sources, and has an exit surface 7 opposite the entry surface 6. A collimating lens 5 is associated which each of the light-emitting diodes, and is situated in front of the light-emitting diode so that the light emitted from the light-emitting diodes is substantially collimated by the respective associated collimating lens 5.

There is also the option to not connect the collimating lenses 5 of the collimation optical system 1 as a single piece, but instead to provide them on separate substrates, it being possible to arrange the substrates next to one another in the first and/or the second direction X, Y. This may result in a column-by-column division or a line-by-line or row-by-row division of the collimation optical system 1 into multiple substrates.

Figure 2:
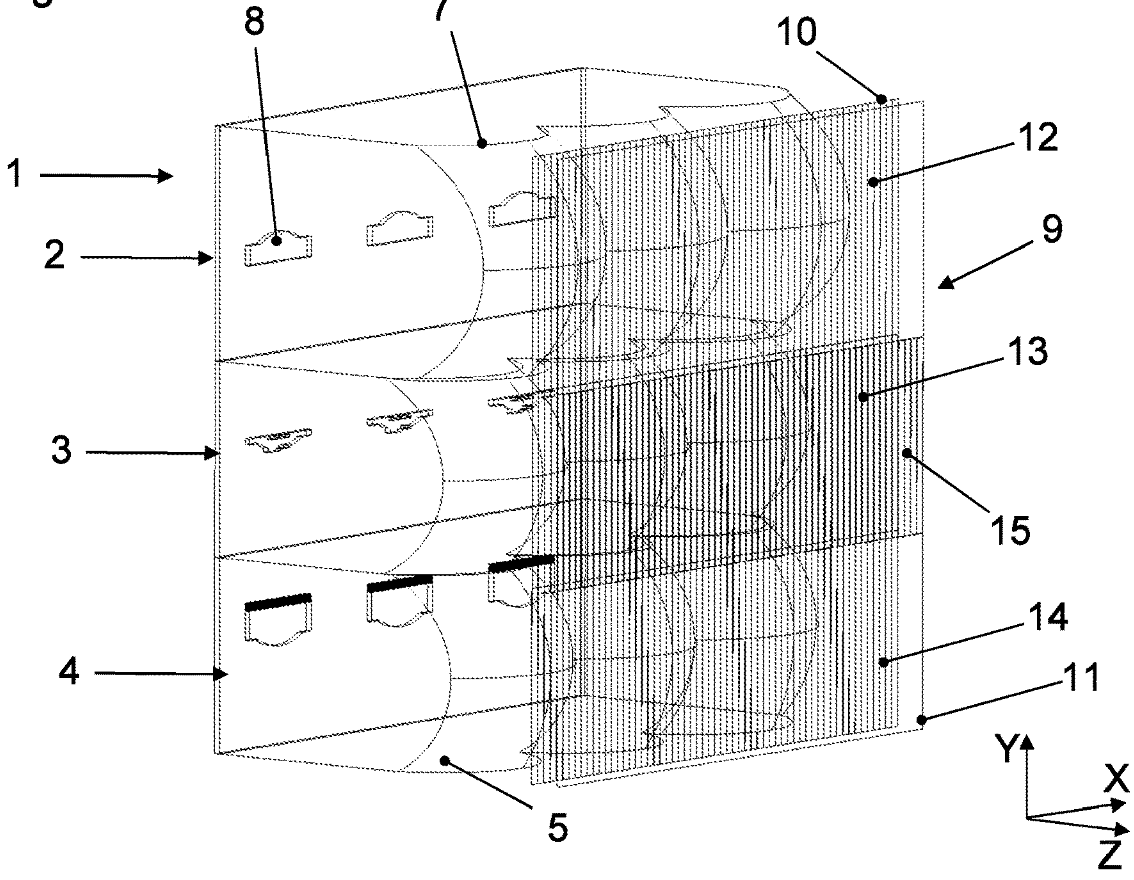
FIG. 2 shows another perspective view of the portion of the example according to FIG. 1.

An aperture 8 is provided in each case on the entry surfaces 6 of the collimating lenses 5, between each of the light sources and the associated collimating lens 5 (see FIGS. 1 and 2). The aperture 8 is designed in each case as an opening in an opaque layer on the entry surface 6. This opaque layer may be applied in particular by vapor deposition or lacquering on the entry surface, it being possible to introduce the opening into the layer by treatment with laser radiation.

There is also the option to design the aperture 8 not as an opening provided on the entry surface 6, but instead as a separate part between the light source and the entry surface 6.

The lower edge of one, multiple, or each of the apertures 8 on the entry surfaces 6 of the collimating lenses 5 (see FIG. 1) may be imaged, as a horizontal light-dark cutoff, into the exterior space of the motor vehicle by the optics of the lighting device, formed by the collimation optical system 1 and the secondary optical unit 9.

The secondary optical unit 9 is made up of an at least partially transparent substrate which includes an entry surface 10 facing the collimation optical system 1 and an exit surface 11 facing oppositely thereto. Alternatively, there is an option for the entry surface 10 and the exit surface 11 to be provided on different, spaced-apart substrates.

On the entry surface 10, the secondary optical unit 9 has a plurality of first arrays 12, 13, 14 of lenses, in particular cylindrical lenses, adjacently situated in the first direction X, through which the light emitted from the collimation optical system 1 passes, at least partially, during operation of the lighting device. The three first arrays 12, 13, 14 are situated adjacently and on top of one another in the second direction Y in FIGS. 1 and 2.

There is also the option to provide more than three or fewer than three first arrays 12, 13, 14 of cylindrical lenses.

On the exit surface 11, the secondary optical unit 9 also has a second array 15 of cylindrical lenses adjacently situated in the first direction X, through which the light that passes through the middle array 13 of the three first arrays 12, 13, 14 may exit from the secondary optical unit 9. On the exit surface 11, no cylindrical lenses or structurings are situated below or above the second array 15.

There is also the option to provide more than one second array 15 of cylindrical lenses. There is a further option to provide the first arrays 12, 13 14 on the exit surface 11 and to provide the at least one second array 15 on the entry surface 10.

The cylinder axes of the cylindrical lenses of the first and second arrays 12, 13, 14, 15 are oriented in parallel to one another, and are arranged in the secondary optical unit 9 in such a way that the cylinder axes of the cylindrical lenses in the installed state of the lighting device in the motor vehicle are oriented essentially in parallel to the vertical. Horizontal spreading of the light distribution generated by the lighting device in the exterior space of the motor vehicle is achieved by this arrangement of the cylindrical lenses.

The cylindrical lenses may have a spherical or an aspherical cross section. They may also have a cross section corresponding to a portion of a sinusoidal function. In addition, the cylindrical lenses may have a cornered, angular, or polygonal cross section. There is also an option for the cylindrical lenses to be formed by prismatic structures.

The individual rows of light sources and collimating lenses 5 or the first arrays 12, 13, 14 of cylindrical lenses and the second array 15 of cylindrical lenses may be used to generate different lighting functions.

Figure 3:
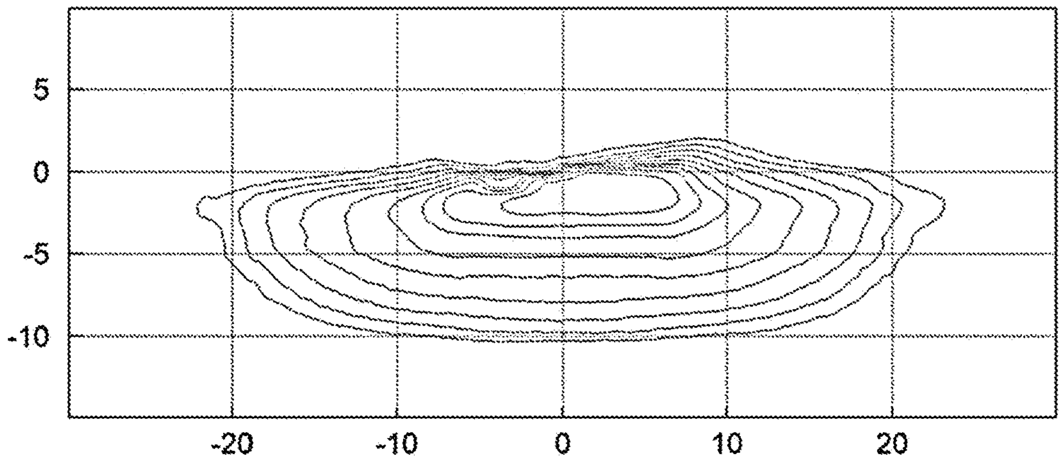
FIG. 3 shows a low beam distribution generated using the example depicted in FIGS. 1 and 2, in which the angles are indicated in degrees (°) on the two axes.

In the illustrated example, the top row of the light sources, the top row 2 of the collimating lenses 5, and the top array 12 of the first arrays 12, 13, 14 are used to generate a high beam distribution. An example of a high beam distribution generated using the lighting device is depicted in FIG. 3.

In the illustrated example, the middle row of the light sources, the middle row 3 of the collimating lenses 5, and the middle array 13 of the first arrays 12, 13, 14 and the second array 15 are used to generate a range portion of a low beam distribution. By use of two arrays 13, 15 of cylindrical lenses arranged in succession, the typically asymmetrical light-dark cutoff of the range portion of the low beam may be imaged into the exterior space of the vehicle in a controlled manner.

In the illustrated example, the bottom row of the light sources, the bottom row 4 of the collimating lenses 5, and the bottom array 14 of the first arrays 12, 13, 14 are used to generate a front field portion of a low beam distribution.

Figure 4:
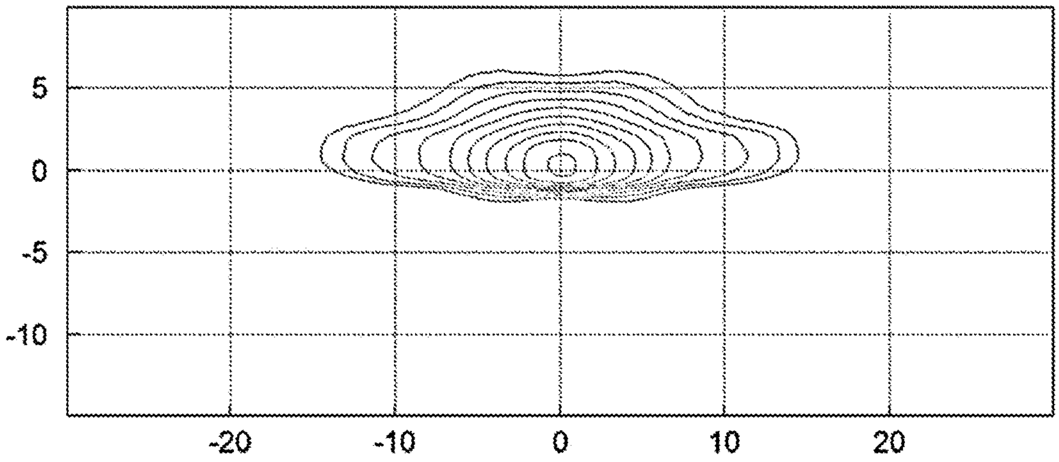
FIG. 4 shows a high beam distribution generated using the example depicted in FIGS. 1 and 2, in which the angles are indicated in degrees (°) on the two axes.
Figure 5:
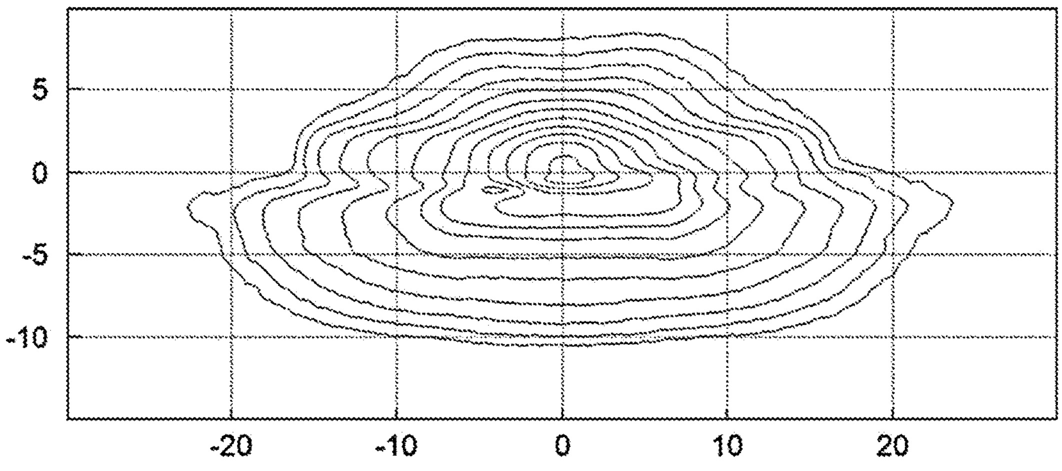
FIG. 5 shows an overall light distribution generated using the example depicted in FIGS. 1 and 2, in which the angles are indicated in degrees (°) on the two axes.

An example of a low beam distribution generated using the lighting device is depicted in FIG. 4. FIG. 5 shows the overall light distribution generated using the lighting device.

The components provided for the individual lighting functions may have different designs. For example, the lenses of the first array 12 provided for generating the high beam may have a larger radius of curvature than the lenses of the first array 13, 14 provided for generating the front field portion and the range portion of the low beam. Furthermore, the lenses of the first array 14 provided for generating the front field portion of the low beam may have a smaller radius of curvature than the lenses of the first array 13 provided for generating the range portion of the low beam. In addition, there is an option for lenses that are used to generate the same lighting function to have different designs in order to form the light distribution of the corresponding lighting function in a targeted manner Also for the collimation optical system 1, similarly as for the arrays 12, 13, 14, 15 of the secondary optical unit 9, the collimating lenses used for different lighting functions may have different designs, for example different focal lengths or different shapes of the entry surfaces and exit surfaces 6, 7. In addition, collimating lenses 5 that are used to generate the same lighting function may have different designs in order to form the light distribution of the corresponding lighting function in a targeted manner.

There is also the option to arrange the components, used to generate the individual lighting functions, in some other way. For example, the top rows of light sources and collimating lenses as well as the top first array of cylindrical lenses may be used to generate the front field portion of the low beam distribution. Furthermore, for example, the lower rows of light sources and collimating lenses as well as the bottom first array of cylindrical lenses and a second array of cylindrical lenses, situated at the bottom, may be used to generate the range portion of the low beam distribution. Moreover, in this example the middle rows of light sources and collimating lenses as well as the middle first array of cylindrical lenses may be used to generate the high beam distribution, in this example the second array 15 of cylindrical lenses being provided only in the bottom region of the exit surface 11.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a motor vehicle, the lighting device comprising:

a plurality of light sources from which light is emitted during operation of the lighting device;

a collimation optical system that comprises collimating lenses, each having an entry surface and an exit surface through which the light emitted from the light sources passes; and a secondary optical unit that comprises arrays of lenses, the light emitted from the collimation optical system passing through the arrays of lenses, wherein the collimating lenses are arranged in at least two rows, at least two of the collimating lenses being adjacently situated in each of the at least two rows in a first direction and the at least two rows being adjacently situated in a second direction that is substantially perpendicular to the first direction, wherein each of the light sources is associated with a respective one of the collimating lenses and at least one of the arrays of lenses of the secondary optical unit, such that the light emitted from each of the light sources passes through the associated one of the collimating lenses and the associated at least one of the arrays of lenses in succession, wherein the arrays of lenses of the secondary optical unit include multiple rows of first arrays of lenses provided on an entry surface of the secondary optical unit and at least one second array of lenses provided on an exit surface of the secondary optical unit, wherein the at least two rows of the collimating lenses include a first row of collimating lenses and a second row of collimating lenses and the multiple rows of first arrays of lenses provided on the entry surface of the secondary optical unit include a first row of the first arrays of lenses and a second row of the first arrays of lenses, wherein the first row of collimating lenses are aligned with the first row of the first array of lenses, the second row of collimating lenses are aligned with the second row of the first array of lenses, and the at least one second array of lenses is provided on the exit surface of the secondary optical unit at a position so as to be aligned with the second row of collimating lenses and the second row of the first array of lenses, such that the first row of the first arrays of lenses is only associated with the first row of collimating lenses and the light sources that are associated with the collimating lenses in the first row of collimating lenses, and such that the second row of the first arrays of lenses is associated with the at least one second array of lenses, the second row of collimating lenses and the light sources that are associated with the collimating lenses in the second row of collimating lenses.

2. The lighting device according to claim 1, wherein the light sources are arranged in at least two rows, wherein in each of the at least two rows, at least two of the light sources are adjacently situated in the first direction, and wherein the at least two rows are adjacently situated in the second direction.

3. The lighting device according to claim 2, wherein the at least two rows of light sources include a first row of light sources and a second row of light sources, wherein the first row of light sources, the first row of collimating lenses and the first row of the first arrays of lenses are configured to generate a first lighting function which is a high beam, and wherein the second row of light sources, the second row of collimating lenses, the second row of the first arrays of lenses and the at least one second array of lenses are configured to generate a second lighting function whish is a low beam or a portion of a low beam.

4. The lighting device according to claim 3, further comprising a third row of light sources, a third row of collimating lenses and a third row of the first arrays of lenses that are aligned with one another, such that the lighting device is additionally configured to generate a third lighting function, wherein the first lighting function is the high beam, the second lighting function is a range portion of the low beam, and the third lighting function is a front field portion of the low beam.

5. The lighting device according to claim 4, wherein, for generating the first lighting function and the third lighting function, only the first row of the first arrays of lenses and the third row of the first arrays of lenses are provided, respectively, and for generating the second lighting function, both the second row of the first arrays of lenses and the at least one second array of lenses are provided.

6. The lighting device according to claim 3, wherein the collimating lenses that are configured to generate different lighting functions have different shapes, and/or wherein the collimating lenses that are configured to generate the same lighting functions have different shapes.

7. The lighting device according to claim 1, wherein the first direction in an installed state of the lighting device in the vehicle corresponds to a horizontal direction, and wherein the second direction in the installed state of the lighting device in the vehicle corresponds to a vertical direction.

8. The lighting device according to claim 1, wherein the lighting device includes a substrate on which all of the collimating lenses are provided, or wherein the lighting device includes a plurality of substrates for the collimating lenses, the substrates being adjacently situated in the first and/or the second direction.

9. The lighting device according to claim 1, wherein the lighting device has at least one aperture that is situated on the entry surface of one of the collimating lenses or between one of the light sources and one of the collimating lenses.

10. The lighting device according to claim 1, wherein the lenses of the arrays lenses of the secondary optical unit are each designed as cylindrical lenses.

11. The lighting device according to claim 10, wherein the cylindrical lenses are adjacently situated in the first direction, and cylinder axes of the cylindrical lenses extend in the second direction.

12. The lighting device according to claim 1, wherein the lenses of the first arrays of lenses of the secondary optical unit that are configured to generate different lighting functions have different shapes and/or different radii of curvature, and/or wherein the lenses of the first arrays of lenses of the secondary optical unit and/or the lenses of the at least one second array of lenses of the secondary optical unit that are configured to generate the same lighting functions have different shapes and/or different radii of curvature.

13. The lighting device according to claim 1, wherein the lighting device is for a headlight of the motor vehicle.

14. The lighting device according to claim 1, wherein each of the lenses in the first row of the first array of lenses are the same as one another and wherein each of the lenses in the second row of the first array of lenses are the same as one another.

* * * * *